C. GEORGI.
REGENERATION OF OLD OR WASTE RUBBER.
APPLICATION FILED JULY 6, 1920.
1,385,869.  Patented July 26, 1921.
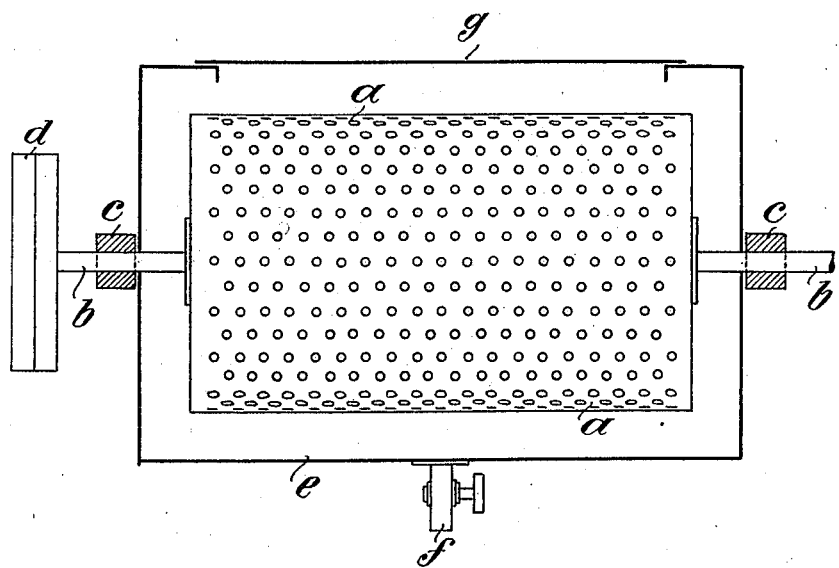
Witnesses:
Emil Kayser
Robert Schaper
Inventor:
Constantin Georgi.
by:
Foster, Freeman, Watson & Coit
Attorneys.

UNITED STATES PATENT OFFICE.

CONSTANTIN GEORGI, OF ZEHLENDORF, NEAR BERLIN, GERMANY, ASSIGNOR TO VANDIVERE B. MOLER, OF YONKERS, NEW YORK.

REGENERATION OF OLD OR WASTE RUBBER.

1,385,869.     Specification of Letters Patent.     Patented July 26, 1921.

Application filed July 6, 1920. Serial No. 394,398.

*To all whom it may concern:*

Be it known that I, CONSTANTIN GEORGI, citizen of Germany, residing at Zehlendorf, near Berlin, Lindenallee 8, Germany, have invented certain new and useful Improvements in the Regeneration of Old or Waste Rubber, for which I have filed applications in Germany on April 9, 1918, and April 1, 1919, of which the following is a specification.

My invention refers to the regeneration of old or waste rubber and its particular object is a method of regeneration whereby the single components are separated with little cost without any mechanical comminution.

If the rubber is subjected to a chemical treatment, valuable components such as fabrics are destroyed and the output is diminished correspondingly. On the other hand, if the so-called mechanical treatment is resorted to which is designed to effect a dissolution of the rubber, a far reaching comminution by grinding is still necessary requiring a considerable expenditure of mechanical energy. The material although remaining chemically unchanged is destroyed in a mechanical sense to such an extent that for instance fibrous constituents which may be admixed to it are no more fit for spinning. The dissolution requires treatment by means of stirring devices and consumes much time and heating material and great quantities of solvents, the high temperatures employed being also detrimental to the quality of the regenerated product. In every case the material to be treated has to pass through different apparatus besides the stirring vessel before being ready for further use.

In the novel method according to the present invention the old or waste rubber is subjected to a purely mechanical treatment, the single constituents remaining chemically unchanged. To this end the rubber without having been subjected to any preliminary mechanical treatment is introduced into an appropriate drum or vessel with open-work or perforated walls which is disposed within another drum or vessel partly filled with an appropriate solvent. The drum or vessel containing the rubber is then imparted a movement which may be reciprocating or rotary, within said outer drum or vessel, or this latter may partake in this movement, both drums or vessels being moved or rotated together, in which case the outer drum or vessel may be integral with the inner one and may even assume the form of a simple jacket surrounding the inner drum or vessel. The two recipients may however also be movable in different directions.

The solvent is heated during this treatment to a moderate temperature, a steam pressure of at least two atmospheres being preferably upheld. The motion imparted to the rubber contained in the inner drum or vessel causes the solvent to enter through the open walls into the material to be regenerated which is thus brought into a prolongated intimate contact with the liquid.

Provided that this treatment is carried on for a sufficiently long time the solvent will have taken up all the rubber and will form therewith a rubber solution free of water and adapted to be smeared, whereas the insoluble constituents of the raw material such as fibers and fabric remain unaltered within the interior drum or vessel. These solid constituents can be easily freed from the adhering solution and can be dried by imparting to the inner drum or vessel, after the outer one has been emptied, a rapid rotary movement which causes the liquid still adhering to the solid material to be removed therefrom by centrifugal action. In order to facilitate this removal of the liquid and the subsequent drying of the fibrous material, it is preferable to subject the solid material to an intermediate treatment with fresh solvent which takes up most of the regenerate solution adhering to the solid material. The rotation of the drum or vessel is preferably continued until the material contained therein is perfectly dry and may then be subjected to mechanical treatment adapted to render it fit for spinning and other purposes.

In the drawing affixed to this specification and forming part thereof the preferred form of an apparatus for use in carrying out the process described is illustrated in a purely diagrammatic manner.

Referring to the drawing, *a* is the perforated inner drum, *bb* are journals provided thereon and located in bearings *c*. *d* is a pulley on one of said journals. *e* is the outer drum or vessel which is assumed to be stationary. *f* is a valve on said vessel for drawing off the regenerate solution and *g* is a removable cover allowing to introduce the solvent. The drums are preferably made in two parts, the upper halves being removed in order to fill or empty the inner drum.

The method described is distinguished by its simplicity and low cost while leaving the fibrous material admixed to the rubber in an uncomminuted state ready for renewed utilization.

I claim:—

1. The method of treating old or waste rubber having incorporated fibrous material which consists in placing the rubber in its original condition in a closed vessel containing a solvent and moving the said waste rubber in the solvent at a moderate temperature under pressure so as to extract the rubber from the fibrous material.

2. The method of treating old or waste rubber and recovering fibrous material contained therein which consists in placing the rubber in its original condition in a closed vessel containing a solvent, moving the said waste rubber in the solvent at a moderate temperature under pressure so as to extract the rubber from the material, removing the solution formed and imparting to the residue a rapid rotary movement so as to expel the adhering moisture from the fibrous material by centrifugal action in said closed vessel.

3. The method of treating old or waste rubber and recovering fibrous material contained therein which consists in placing the rubber in its original condition in a closed vessel containing a solvent and moving the said waste rubber in the solvent at a moderate temperature and under a steam pressure of at least two atmospheres in said vessel so as to extract the rubber from the material.

4. The method of treating old or waste rubber and recovering fibrous material contained therein which consists in placing the rubber in its original condition in a closed vessel containing a solvent, moving the said waste rubber in the solvent at a moderate temperature and a pressure of not less than two atmospheres so as to extract the rubber from the material, removing the solution formed from the vessel, rinsing with some fresh solvent and subsequently draining off the solvent and lastly imparting to the residue a rapid rotary movement so as to expel the adhering moisture by centrifugal action in said vessel.

In testimony whereof I affix my signature in presence of two witnesses.

CONSTANTIN GEORGI.

Witnesses:
WILHELM WIEGERT,
ALFRED BLÜMS.